Figure 1:
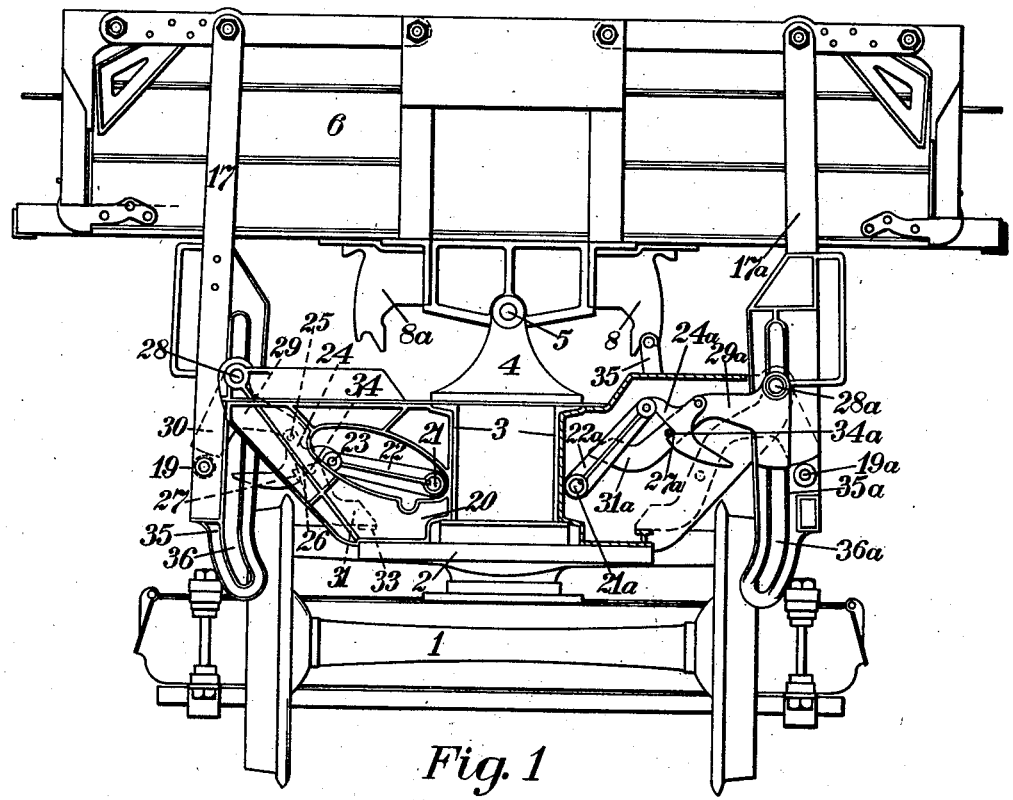

C. H. DOTY & W. L. BURNER.
DUMP CAR.
APPLICATION FILED SEPT. 15, 1908.

915,419.

Patented Mar. 16, 1909.
2 SHEETS—SHEET 1.

WITNESSES:
R. Rogers

Charles H. Doty,
William L. Burner, INVENTORS.
BY
Geo. W. Righenine,
ATTORNEY.

UNITED STATES PATENT OFFICE.

CHARLES H. DOTY AND WILLIAM L. BURNER, OF COLUMBUS, OHIO, ASSIGNORS TO THE KILBOURNE AND JACOBS MANUFACTURING COMPANY, OF COLUMBUS, OHIO, A CORPORATION OF OHIO.

DUMP-CAR.

No. 915,419.        Specification of Letters Patent.        Patented March 16, 1909.

Application filed September 15, 1908. Serial No. 453,201.

*To all whom it may concern:*

Be it known that we, CHARLES H. DOTY and WILLIAM L. BURNER, citizens of the United States, residing at Columbus, in the county of Franklin and State of Ohio, have invented certain new and useful Improvements in Dump-Cars, of which the following is a specification.

Our invention relates to improvements in dump cars having displaceable sides which are preferably carried on a pivoted arm, and through the lifting effect of a swinging arm are held aloft on the side toward which the car is dumped when the dumping operation takes place, whereby the lading may be discharged, and relates especially to the construction of the swinging or dumping arm, and means for locking and controlling the same during the dumping operation, and for retaining the same in proper position when the car body is in its normal position. We contemplate the application of our improved arm locking devices therefore to a car preferably dumped by air, the locking device being controlled preferably by a longitudinal shaft operated by the action of the piston in dumping the car, connection being established from the end of the shaft with the locking devices.

Essentially our invention comprises the use of a dumping arm carrying an abutment or stop against which the lock is adapted to engage when the car body is in normal position, said dumping arm being slotted in its lower portion to receive the pivot upon which the lock is mounted. The lock consists essentially of a dog or lever having a locking arm and an operating arm, the latter being controlled by a second dog or cam lever actuated from the shaft above mentioned.

A preferable form of embodiment of our invention and of its application to a car of the proper kind is shown in the drawings as will be hereinafter clearly set forth.

It is contemplated to apply our invention to a car which may be automatically dumped and righted either by manipulating the air device at the car itself, or from another car or from an engine drawing the train. Thereby a long train of cars may be quickly dumped and righted.

Figure 2:
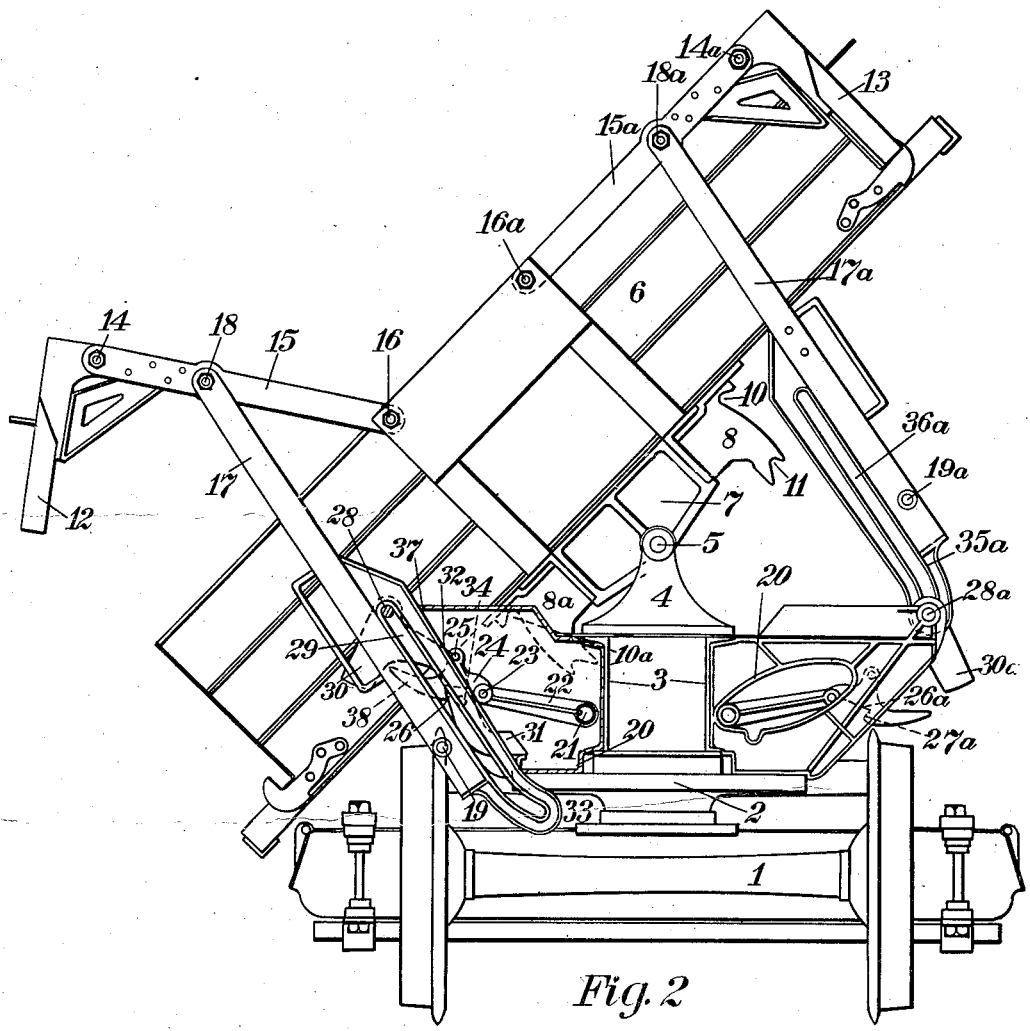

In the accompanying drawings which are hereto attached and hereby made a part of this application, Figure 1 is an end view of a car having our improved locking and dumping devices thereon, the car body being in normal position; Fig. 2 is an end view of the car shown in Fig. 1, the car box being in dumped position.

Referring to the drawings, 1 is the truck of a preferred kind and construction, upon which a supporting framework 2 is mounted; in this framework is mounted in a preferred manner the center sill construction shown at 3, upon which at appropriate points are mounted bracket members 4, it being understood that there may be two or more such bracket members arranged upon such center sill beneath the car box. The bracket members 4 carry each a pivot 5 upon which is rotatably mounted a car box 6 by means of the frame 7, it being understood that this frame may be constructed as desired. Depending from the car box are the plates 8 and $8^a$ arranged on the opposite sides of the pivot member 5, these plates being each provided with notches 10 and 11, with which the piston rod engages for the purpose of dumping or righting the cars, in a manner well understood and especially shown in Patent No. 872,057 to Charles H. Doty, and inasmuch as this construction is not herein claimed in any manner, it is not deemed necessary to set forth the same any further than by the reference to the said Letters Patent. The location of the cylinder for dumping and righting the car box may be as desired, although in the drawings we have illustrated the notched plates at the end of the car box.

The car box shown in the drawings is provided with doors 12 and 13 at the sides thereof, said doors depending from the pivot shown at 14, carried by the arm 15, which in turn is pivoted on the end of the car at 16, so that it may swing upwardly and downwardly thereby carrying the door therewith. The upward and downward movement of the door 14 is controlled by the arm 17 pivoted thereto at 18; the arm 17 is preferably formed of two plates or bars arranged in parallel, it not being deemed necessary to present an edge view of this construction, inasmuch as it will be well understood; near the lower end of the bar members 17, and between them is mounted the roller or stop 19 for a purpose hereinafter to be described.

A casing 20 is shown in section at the left side of Fig. 2, and appears in full on the right side of Fig. 2; in this casing is positioned the end 21 of the shaft which is adapted to operate the locking construction. Rigidly carried by the shaft 21 is the arm 22, which at its outer end, is pivotally connected at 23 with a dog 24 carrying thereon the pin 25. Upon one of its edges the dog 24 is formed with a portion thereof cut away as shown at 26, thereby forming a hook or shoulder 27 thereon.

Mounted in the casing 20 upon the pivot 28 is a lever 29 having the blunt end or nose 30 thereon, and an arm 31 which is curved as shown at 32. The normal position of the dog or lever 29 is shown at the left in Fig. 1, the other parts also being in normal position in said figure; referring thereto it is seen that the nose or end 30 engages against the roller 19, the lower end of the arm 31 engages against the stop 33 formed in the bottom of the casing 20, and in this position of the lever 29 it is clearly seen that the dumping arm 17 could not be lifted, and therefore the car box can not be dumped so long as this locking dog or lever 29 remains in this position. The lever 24 is shown in normal position at the left in Fig. 1, in which it is seen that the cutout 26 receives the pin 34 on the lever 29, the lever 24 therefore resting upon the pin 34 in this position of the parts.

At the right in Fig. 1, is shown the position of the parts when the piston has been actuated sufficiently to rotate the shaft 21 and the arm 22 thereon to lift the lever 29 out of engagement with the stop 19$^a$, this lifting being effected by the engagement of the pin 34$^a$ with the shoulder 27$^a$, and as the lever 24$^a$ is further lifted by the movement of the arm 22$^a$, the lever 24$^a$ picks up the long arm 31$^a$ of the lever 29$^a$ and rotates the same on its pivot 28$^a$, thereby unlocking the dumping arm 17$^a$. Thereupon, by the further application of the air, the piston rod shown at 35 engages the bracket 8, and lifts the car box 6 to rotate the same on its pivot 5, whereby the dumping arm is moved upwardly with the car box, as shown at the right in Fig. 2, in which figure the car is shown as fully dumped, it being seen that the lower slotted portion 35$^a$ of the dumping arm 17$^a$ has been permitted to pass upwardly by reason of the slot 36$^a$ therein, being guided in its upward movement by the pin or pivot 28$^a$ engaging with the slot 36$^a$. In the construction shown in the drawings the lower end of the slot 36$^a$ engages the pin or pivot 28$^a$ and the arm 17$^a$ is stopped thereby, thereby preventing the car door on the elevated side from leaving its closed position, which might otherwise take place under the impetus of the dumping movement. Approximately at the instant the dumping movement is completed, the piston rod 25 breaks connection with the bracket or plate 8, and is retracted with the downward movement of the piston, consequent upon the withdrawal of the air from the cylinder; this movement of the piston permits the shaft 21$^a$ to rotate whereby the arm 22$^a$ is lowered, thus permitting the long arm 31$^a$ of the lever 29$^a$ to return to its normal position shown in dotted lines at the right in Fig. 1, and in the heavy lines at the right in Fig. 2, so that when the car box is righted, the stop 19$^a$ moving downwardly contacts with the outer face of the end 30$^a$ of the lever 29$^a$ and causes the same to rotate, and when the stop has passed downwardly beyond the end 30$^a$, the lever 29$^a$ drops into its normal position. The stop 19$^a$ in this position is below the nose or end portion 30$^a$ of the lever 29$^a$, the latter effectually preventing any upward movement of the arm 17$^a$ so long as the locking dog or lever 29$^a$ remains in this position.

The above description shows the operation of the locking and releasing devices on the side of the car box which is lifted during the dumping operation, and we shall now describe the operation of the locking and releasing devices on the side of the car box toward which the dumping takes place, or which is lowered in the dumping operation.

Referring to Fig. 1, on the left thereof is seen the position of the locking and releasing devices when the car box is in its normal position, and at the left of Fig. 2 is shown the position of these parts when the car box has been dumped. It is apparent that the position of the locking lever or dog 29 on the side of the car box toward which the dumping takes place, need not be changed in anywise to permit the dumping operation to take place, and consequently the said lever 29 at the left of said Fig. 2 is shown in its normal position when the dumping operation has been completed. During this operation it is seen that the dumping arm 17, being pivoted at 18, will be guided at its lower end by the pivot or pin 28, and that the lower end of said arm 17 occupies a position toward the center of the car when the car box has been dumped, the pivot or pin 28 having acted in one as a guide but also as a pivot point for said lever 17 during this movement of this car box to its dumped position. In this inwardly swinging movement of the lower end 35 of the arm 17, the pin 25 is engaged by the face 37 of the slotted lower end 35, and the lever 24 is thereby swung upwardly on its pivot 23, out of engagement with the pin 34 on the lever 29. When the car box is to be righted, the piston rod will engage the notch 10$^a$ on the plate 8$^a$, and by its upward movement in lifting the car box will rotate the shaft 21 thereby swinging the lever 24 on its pivot 23; but as the car box is lifted, the lower slotted portion 35 of the arm 17 swings outwardly on the pin 28, thereby permitting the lever 24 to fall through the contact of the pin 25 with the face 37. During this falling movement the curved face 38 of lever 24 drops into contact with pin 34 on lever 28, and is thereby guided thereover to cause the shoulder or hook 26 to be brought into position to engage said pin 34. When the piston has settled back to its normal position, the lever 24 and the pin 34 will occupy the relative positions shown at the right in Fig. 1.

It is therefore seen that our construction enables us to positively lock the dumping arm against any lifting movement thereon until the locking levers or dogs 24 and 29 have been actuated as hereinbefore described through the operation of the shaft 21, the rotation of the latter being dependent upon the operation of the air cylinder; it is further clear that when the locking levers on one side of the car have been released, those on the other side of the car during the dumping operation are so positioned as to positively lock the dumping arm on that side of the car when the car box is again restored to its normal position. The slotted portion of the dumping arm is made of such length as to accommodate the movement of the car box during the dumping operation, it being preferably so constructed as to form a stop at its lower end to prevent the car box from being dumped too far, and at its upper end to form a stop whereby the proper position of the door of the car is determined on the side toward which the car box is dumped; further, the slotted portion of the dumping arm receives the pin or pivot described, which acts both as a guide for said arm and as a pivot point therefor. Further, it is seen that the lever which lifts the locking lever out of its locking position, is adapted to be actuated by the slotted portion of the dumping arm on the side of the car toward which the car box is being dumped, so that when the pivoted end of the lever is afterward raised through the righting operation, the shoulder on the said lever will be properly positioned for engagement with the pin on the locking lever, whereby, when it is subsequently desired to tilt the car box in the opposite direction the said lever is in proper position for lifting the locking lever to permit the car box to be dumped.

In the drawings we have shown a preferable embodiment of our invention, but we do not desire to be confined to the specific construction shown, but desire to claim all modifications which fall within the scope of our invention.

What we claim is:

1. In a dumping car having swinging side members, a dumping arm slotted at its lower end, a guide in said slotted portion, a pivoted lever for engaging said arm to lock the same against upward movement thereof, and means for lifting said lever out of its locking position to permit the car to be dumped toward the opposite side.

2. In a dumping car having swinging side members, a dumping arm for manipulating said side members having its lower end slotted, a guide in said slotted portion, a pivoted lever for engaging said arm to lock the same against upward movement thereof, a second pivoted lever engaging said first lever, and means for operating said second lever to lift said first lever out of locking position.

3. In a dumping car having swinging side members, a dumping arm for manipulating said side members having its lower end slotted, a pin on said car engaging said slot, a lever pivoted on said pin, a stop carried by said arm for engaging said lever to lock said arm against the upward movement thereof, and means for unlocking said arm.

4. In a dumping car having swinging side members, a dumping arm pivotally connected to said side members for manipulating the same and having a longitudinal slot in its lower end portion, a pin mounted on said car and engaging said slot, a lever pivoted on said pin and provided with oppositely directed arms, a stop carried by said dumping arm adapted to engage one of the arms of said lever, the other arm of said lever being adapted to engage with the car, whereby said dumping arm is positively locked against an upward movement thereof.

5. In a dumping car having swinging side members, a dumping arm pivotally connected to said side members for manipulating the same and having a longitudinal slot in its lower end portion, a pin mounted on said car and engaging said slot, a lever pivoted on said pin and provided with oppositely directed arms, a stop carried by said dumping arm adapted to engage one of the arms of said lever, the other arm of said lever being adapted to engage with the car, whereby said dumping arm is positively locked against an upward movement thereof, and means for lifting the latter arm of said lever whereby the other arm thereof is moved out of its locking position to permit the dumping arm to be lifted.

6. In a dumping car having swinging side members, a dumping arm for manipulating each of said side members slotted in its lower end portion, a guide engaging said slotted portion mounted on said car, a stop carried by said dumping arm, a lever pivoted on said car and positioned for engaging said stop to unlock said arm to permit upward movement thereof, a pin on said lever, a second lever adapted to engage said pin, and means for manipulating said second lever to lift said first lever through said engagement, whereby the said dumping arm is rendered free to move upwardly.

7. In a dumping car having swinging side members, a dumping arm for each of said members having its lower end portion provided with a slot, a guide mounted on said car engaging said slot, a locking lever pivoted on said car for preventing the upward movement of said dumping arm but permitting a downward movement thereof, a second lever constructed to engage said first lever to lift the same out of locking position, and means on said second lever engaging with said dumping arm whereby during the downward movement of said dumping arm the said second lever is moved out of engagement with said first lever.

8. In a dumping car having swinging side members, a dumping arm for each of said members having its lower end portion provided with a slot, a guide mounted on said car engaging said slot, a locking lever pivoted on said car for preventing an upward movement of said dumping arm but permitting a downward movement thereof, a second lever constructed to engage said first lever to lift the same out of locking position, and means on said second lever engaging with said dumping arm whereby during the downward movement of said dumping arm the said second lever is moved out of engagement with said lever, and during the righting of the car is again permitted to return to its normal engagement with said first lever.

9. In a dumping car having swinging side members, a dumping arm therefor having its lower end portion slotted, a guide engaging with said slotted portion, a locking lever adapted to prevent an upward movement of said arm, a second lever having a hook thereon to engage said first lever, a pin on said second lever adapted to be engaged by said dumping arm during the downward movement of the latter, whereby said second lever is moved out of engagement with the pin, on said first lever, and means for restoring said second lever to its engagement with said first lever during the righting operation of the car.

10. In a dumping car having swinging side members, a dumping arm slotted in its lower end portion, a stop carried by said dumping arm, a guide engaging said slotted portion, a locking lever pivoted on said guide to engage said stop to prevent upward movement of said arm, means for disengaging said lever from said stop to permit the upward movement of said arm, means for returning said lever to its normal position, said stop during the return movement of said arm being adapted to swing said locking lever on its pivot to permit said stop to pass beyond said lever into locking position.

In testimony whereof we affix our signatures in the presence of two witnesses.

CHARLES H. DOTY.
WILLIAM L. BURNER.

Witnesses:
J. D. BENBOW,
ERNST M. LIED.